2,818,427

PREPARATION OF VERBENYL COMPOUNDS FROM 3-PINENE-2-OL

Joseph P. Bain and Wilbur Y. Gary, Jacksonville, Fla., assignors to The Glidden Company, Cleveland, Ohio, a corporation of Ohio No Drawing. Application August 27, 1953
Serial No. 376,997

7 Claims. (Cl. 260—489)

The present invention relates to the manufacture of verbenol and its esters.

Verbenol is a naturally occurring terpene alcohol but is available only in small amounts from natural sources, essential oils. It possesses a pleasant unique odor, thus making it potentially useful for perfumes and industrial masking agents. Furthermore, it has been found that when verbenol is converted to an emulsifiable product consisting of a solution of 80 parts verbenol and 20 parts green soap (50% solids content) that this composition when tested for phenol coefficiency according to the method of USDA Circular 198 (1931) using *Salmonella typhosa* as test organisms, shows a phenol coefficient of 5.5 corresponding to values obtained using similarly formulated preparations but employing steam distilled pine oil instead of verbenol. Verbenol also possesses excellent solvent and wetting properties and is a useful organic intermediate for preparation of a wide variety of essential oil constituents. It is desirable, therefore, to produce verbenol economically. It is known to produce verbenol by working up oxidation products of alpha-pinene, but yields are poor when using procedures of the prior art. In copending Serial No. 352,291, filed April 30, 1953, however, it is disclosed that good yields of easily purifiable verbenol are obtained by contacting pinene with air until the peroxide value of the product reaches 1000 to 2000 and then reducing the peroxide value to a low value or zero, suitably by means of treatment with a warm alkaline sodium sulfite solution. On fractionation of the reduced product, pure verbenol of B. P. about 96–98° C. at 10 mm., is obtained, as is also the isomeric alcohol, 3-pinene-2-ol. This novel alcohol, like verbenol, exists in cis- and trans-forms. The tertiary alcohol identified as the trans-form and which is found in smaller proportion boils at about 76° C. at 10 mm., and the alcohol identified as cis-3-pinene-2-ol boils at 83° C. at 10 mm. We have found that these isomeric tertiary alcohols can be converted readily to verbenol by isomerization procedures which are fully disclosed below. Thus, the total yield of verbenol from oxidation of pinene can be substantially increased by isomerizing the isomers of verbenol to verbenol itself.

As is known, optically active verbenol is produced by oxidizing optically active pinene. Furthermore, as shown in said copending application Serial No. 352,291, the cis- and trans-forms of 3-pinene-2-ol are also optically active if prepared from optically active pinene.

If optically pure verbenol is required, it is best to start with optically pure pinene, since a partly active verbenol is difficult to separate into a racemic product and an optically pure product as by crystallization. However, as is shown in said copending Serial No. 352,291, the partly optically active 3-pinene-2-ols derived from partly active pinene can be partly crystallized whereby the optically pure form separates first and can be separated off as by filtration from the liquid racemic forms. The optically pure 3-pinene-2-ol can then be isomerized to optically pure verbenol. A further unique feature of our present invention is that verbenol of higher purity can more easily be prepared from 3-pinene-2-ol isomerization than by purification of the verbenol already present in the oxidation mixture. Thus, when the oxidation mixture is treated according to the prior art or according to the process disclosed in said copending application Serial No. 352,291, the verbenol fraction isolated contains verbenone and usually myrtenol since these compounds are always present to some extent in such oxidation mixtures and since they boil within a few degrees of verbenol. Special chemical means for separating out traces of these impurities from the desired verbenol can, of course, be employed, but such means represent an added expense. However, the 3-pinene-2-ols boil substantially lower than verbenol and are not contaminated by verbenone or myrtenol if they are well fractionated, so that after isomerization the verbenol so produced from them is easily purified and represents an excellent grade for use where its characteristic odor is desired.

It is accordingly an object of this invention to provide a process for converting 3-pinene-2-ol to verbenol.

Another object is to provide a process for preparing verbenol from readily available raw materials in improved yields.

Another object is to provide a process for producing optically pure verbenol from partly optically active pinene.

Another object is to provide a process for converting 3-pinene-2-ol to verbenyl esters.

Other objects will be apparent to those skilled in the art from study of the following disclosures.

The following depicts the reactions employed:

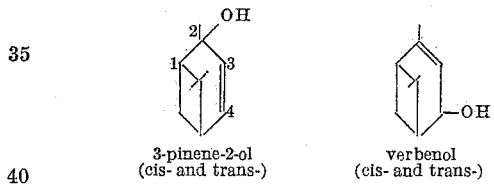

3-pinene-2-ol      verbenol
(cis- and trans-)    (cis- and trans-)

As shown in said copending application Serial No. 352,291, 1-alpha-pinene yields dextro rotatory cis- and trans-3-pinene-2-ol and, of course, d-alpha-pinene yields the levo rotatory tertiary alcohols, a sign inversion taking place. Also, 1-alpha-pinene yields 1-trans-verbenol as is known to prior art. We have found that the dextro 3-pinene-2-ols also yield 1-trans-verbenol on isomerization. Further we find that 1-trans-verbenol is isomerizable to d-cis-verbenol. Therefore, there can exist in equilibrium 1-trans-verbenol, d-cis-verbenol and the two d-3-pinene-2-ols. Products from d-pinene oxidation are, of course, of opposite sign. No racemization takes place throughout these transformations and, therefore, pure distillate fractions derived from pinene oxidation products show optical purities proportional to the purity of the starting pinene. As has been pointed out, however, the optically pure 3-pinene-2-ols may be readily separated from chemically pure but optically impure fractions by virtue of the lesser solubility of the optically pure forms.

We have found that when cis- or trans-3-pinene-2-ol or cis- or trans-verbenol or mixtures of any or all of these are treated with acids, there results a mixture of all four allylomers, apparently an equilibration mixture. However, the equilibrium is far in favor of trans-verbenol so that the 3-pinene-2-ols can be readily converted to a mixture of allylomers containing 80 to 90% or so of trans-verbenol which can be separated easily as pure material by fractionation, most suitably at reduced pressures. The recovered trans-verbenol may contain traces of cis-verbenol which boils only about two degrees lower than the trans-form. It will be apparent that lower boiling fractions obtained on fractionation of such equilibrated mixtures of the allylomers will be rich in the 3-pinene-2-ols and there may also be some cis-verbenol present and such fractions can be equilibrated again so that ultimately practically all the tertiary alcohols are converted to verbenol.

It is, of course, not necessary to employ the pure 3-pinene-2-ols for the isomerization. For example, as revealed in said copending application Serial No. 352,291, alpha-pinene oxidation products isolable by the process of that invention are rich in pinene oxide, 3-pinene-2-ol and verbenol, and certain lesser quantities of verbenone, myrtenal and myrtenol. Such a material can be treated with hot water or dilute acids to convert part or most of the 3-pinene-2-ol to verbenol. However, pinene oxide is very sensitive to water and acids and would be converted to sobrerol, campholenealdehyde, carveol, etc., and thereby complicate the isomerization mixture. For manufacture of verbenol it would be better to fractionate the mixed oxidation products and employ either the mixed 3-pinene-2-ols alone, or to separate the total 3-pinene-2-ols plus verbenol (such a mixture boils over the range about 75 to 98° C. at 10 mm.), and isomerize this mixture to a product much richer in verbenol. Of course, if this is done, the resulting verbenol will possess an optical rotation proportional to the starting pinene and advantage is not thereby taken of the fact that optically pure verbenol can be produced from an optically pure 3-pinene-2-ol which can be isolated from the oxidation products from even a partially active alpha-pinene.

The isomerization can be conducted suitably at room temperature with weak acids or dilute acids or at higher temperatures even with as weak an acid as distilled water. Stronger acids or higher concentrations preferably can be employed at temperatures below ambient temperatures. The identity of the acid is not important in effecting the isomerization and acid salts etc. can be used satisfactorily. It is shown in copending application Serial No. 368,210, filed July 15, 1953, that verbenol itself can be isomerized with acids to isomeric monocyclic alcohols, largely conjugated menthadiene-8-ols. In converting 3-pinene-2-ol to verbenol, therefore, it is best to choose relatively mild conditions providing better control of the reaction so that the secondary conversion of verbenol can be more readily prevented or controlled. Such selective conditions are easy to find as indicated by the Examples. However, if a different acid or other variable is to be employed, then the conversion of 3-pinene-2-ols can be readily followed by polarimetry if the products being studied are optically active or in a number of other ways such as by means of infrared examination of samples withdrawn from the reacting system. Also conversion of verbenol to the conjugated menthadiene-8-ols or dehydration to verbenene is easily detected by ultraviolet spectrophotometric methods since such compounds exhibit strong absorptions in the ultraviolet region of the spectrum above 220 m$\mu$, whereas verbenol and 3-pinene-2-ol do not. It is therefore simple to determine experimentally various satisfactory sets of conditions of time, acidity, temperatures, agitation, etc. to accomplish the conversion of 3-pinene-2-ol to verbenol and without causing substantial conversion of the verbenol to monocyclics.

Verbenol is readily dehydrated by heating with acids and in order to prevent such a result we prefer to neutralize the conversion product prior to distilling it. Suitably this is accomplished by washing the organic layer with dilute soda ash, etc. until it is neutral.

Also we find that is verbenyl esters are desired, then these are readily prepared by isomerizing 3-pinene-2-ol in the presence of suitably esterifying agents such as acetic anhydride.

In copending application Serial No. 388,414, filed September 14, 1953, it is shown that verbenol is readily converted to verbenyl chloride on treatment with concentrated hydrochloric acid or gaseous dry hydrogen chloride. 3-pinene-2-ol likewise yields verbenyl chloride on such treatment, thereby showing further that in the presence of acids the 3-pinene-2-ol structure is readily converted to the verbenyl structure.

It will be further understood that while trans-verbenol is apparently more stable than the cis-form in the presence of acids that the present invention also provides a method for producing cis-verbenol from 3-pinene-2-ol, since this verbenol isomer can be isolated by careful fractionation of such conversion mixtures.

The following examples are illustrative of the invention.

*Example 1*

10 grams of trans-3-pinene-2-ol, B. P. 76° C. at 10 mm., $[\alpha]_D^{27}$ +24.4 (36% in heptane) $N_D^{25}$ 1.4730, $d_4^{55}$ 0.9429, was shaken with 20 ml. of 2.5% sulfuric acid at 50° C. for 30 minutes. The resulting product was found to contain 70% of verbenol of predominately the trans-configuration.

*Example 2*

40 parts of the same trans-3-pinene-2-ol as was used in Example 1 was heated to boiling with 100 parts of distilled water with agitation and samples were withdrawn from the boiling mixture at intervals. Infrared analysis showed that after 18 minutes boiling the mixture contained approximately 34% verbenol, and the sample taken after 36 minutes contained approximately 42% verbenol and only about 10 to 15% of the starting alcohol remained unreacted. After one hour and 36 minutes, no starting material remained and less than 10% verbenol remained, and a sample collected after 2 hours and 45 minutes boiling contained neither the starting material nor verbenol.

*Example 3*

When 20 grams of the same trans-3-pinene-2-ol as used in Examples 1 and 2 was boiled with 50 grams of distilled water containing 1.0 gram of sodium acetate, there was no evidence that isomerization had taken place after 3½ hours boiling.

*Example 4*

When d-cis-3-pinene-2-ol, obtained from l-$\alpha$-pinene, was stirred with an equal volumn of 1% sulfuric acid for one minute, the temperature rose to 50° C., and infrared analysis showed the product to be 86% verbenol. On fractionation, the best cuts of verbenol, as judged by infrared analysis, boiled at 95.5° C. at 10 mm. and showed $N_D^{25}$ 1.4898, $\alpha_D^{27}$ −162.8° (10 cm. tube) or $[\alpha]_D^{27.5}$ −169.0°, and M. P. 22.5° C., data in good agreement with the literature for pure verbenol.

*Example 5*

Seventy-five grams of 3-pinene-2-ol was stirred with 60 grams acetic anhydride and 6 grams sodium acetate. There was no slow spontaneous rise in temperature as occurs when verbenol is esterified. Even at 60° C., no reaction was evident and the sodium acetate remained undissolved. When heated at 80° C., however, the sodium acetate gradually dissolved and the reaction became exothermic, the temperature rose to 90° C. Heat was discontinued and the product was allowed to stand overnight. It was poured into water to decompose any remaining acetic anhydride and washed free of acetic acid. Through comparison of its infrared spectrum with spectra of samples of the pure compounds, it was shown to contain about 60–70% verbenyl acetate, a little verbenene and a trace of cymene.

*Example 6*

50 grams of crude 3-pinene-2-ol, $\alpha_D^{26}$ +75.40° (10 cm. tube), M. P. 31° C., was agitated with 100 grams of 37% hydrochloric acid for about 5 minutes. The separated oil layer weighed 54 grams (theory=56 grams). The infrared spectrogram of this product showed it to possess the characteristic absorptions of verbenyl compounds such as verbenol. There were, however, no hydroxyl absorptions. The resulting verbenyl chloride product showed a rotation of $\alpha_D^{26}$ −130° (10 cm. tube), the reversal in sign of optical rotation further indicating isomerization to the verbenyl structure.

Example 7

A mixture of optically impure cis- and trans-3-pinene-2-ol and containing small quantities of pinene oxide and a carbonyl compound was allowed to crystallize partly, and the almost optically pure cis-form of 3-pinene-2-ol that separated was centrifuged off. Six gallons of the mother liquor, now representing less optically pure 3-pinene-2-ol than prior to crystallization was treated with three liters of 1% aqueous sulfuric acid and the mixture was thoroughly agitated. Cooling was used so that the temperature did not rise above 32° C. due to the exothermic isomerization. After one hour the reaction was stopped by adding a 50% excess of sodium carbonate over that required to neutralize the mineral acid. After allowing the aqueous phase to settle, the oil was decanted and five gallons of it was fractionated at 20 mm. pressure and at reflux ratios ranging from 30:1 to 19:1 using a nine foot x two inch column packed with an efficient metal packing.

Fractions rich in cis-verbenol were combined and refractionated through a smaller column to obtain pure cis-verbenol, B. P. about 94° C. at 10 mm., which solidified at room temperature. Since it was produced from almost optically inactive 3-pinene-2-ols, it possessed almost zero rotation. It was obtained in about 3% yield based on the weight of the starting material, while the ordinary or trans-verbenol, B. P. 96° C. at 10 mm., was obtained in 61% yield. About 4.2% of 3-pinene-2-ol (mixed cis- and trans-) was also recovered. The remainder of the fractions consisted largely of alpha-campholene aldehyde, verbenene, pinocamphone, etc., which were present in the crude original starting material and which were now easily separated since they were more readily separable from verbenol by distillation than from the 3-pinene-2-ol with which they were admixed originally.

Example 8

One part of pure cis-3-pinene-2-ol was boiled and agitated with ½ part of distilled water. Samples were removed at intervals for infrared and ultraviolet analysis to follow the course of the reaction. The results are shown here:

| Time of Reaction | Percent trans-verbenol | Remarks |
|---|---|---|
| 1 minute | 73 | Balance mostly unreacted 3-pinene-2-ols. |
| 5 minutes | 93 | Minimum tertiary alcohols. |
| 15 minutes | 88 | Minimum 3-pinene-2-ols but increasing tertiary alcohols. |
| 30 minutes | 85 | Tertiary alcohols, verbenene present as impurities. |
| 60 minutes | 78 | |

Cis-verbenol was detectable in all samples but was not readily measurable because of its small proportion. The verbenene and tertiary alcohols, mostly 8-hydroxy-phellandrenes, increased regularly in concentration as the reaction proceeded.

It is thus seen that in the presence of materials about as acidic as water at a pH of 7 or more acidic than water, the allylic structure of 3-pinene-2-ol is readily changed to the allylic structure of verbenol, the rate of reaction depending upon the acidity and the temperature. Thus, at higher acidities lower temperatures can be used, while at low acidities the rate can be increased by increasing the temperature. The desired degree of acidity can be obtained in various ways. Thus, instead of adding acid directly, acid can be formed in situ. Also acid salts and buffered solutions can be used to produce any degree of acidity desired.

It is thus seen that the present invention provides a means for producing increased yields of verbenol from the air oxidation of α-pinene.

The starting material, 3-pinene-2-ol, and its preparation, as well as the fractionation of the reduced oxidation mixture of α-pinene, is described and claimed in application Serial No. 352,291, and the preparation of verbenyl chloride is specifically claimed in application Serial No. 388,414. The isomerization of verbenol to monocyclic alcohols is described and claimed in application Serial No. 368,210.

Having described the invention, what is claimed is:

1. The process of preparing verbenyl compounds which consists essentially in subjecting 3-pinene-2-ol to the influence of hydrogen ions at a concentration at least as great as that formed on heating the alcohol with distilled water, and stopping the treatment before the reaction mixture exhibits substantial absorption in the ultraviolet region of the spectrum above 220 mμ.

2. The process of claim 1 in which the 3-pinene-2-ol is optically active.

3. The process of preparing verbenol by heating 3-pinene-2-ol in the presence of distilled water for a time such that at least some of the 3-pinene-2-ol is isomerized to verbenol and stopping the treatment before the reaction mixture exhibits substantial absorption in the ultraviolet region of the spectrum above 220 mμ.

4. The process of claim 1 in which the acid conditions are provided by an aqueous mineral acid.

5. The process of claim 4 in which the aqueous mineral acid is dilute sulfuric acid.

6. The process of claim 1 in which the treatment is effected under acylating conditions.

7. The process of claim 1 in which the acid conditions are provided by acetic anhydride.

References Cited in the file of this patent

UNITED STATES PATENTS 2,537,638     Kitchen     Jan. 9, 1951

OTHER REFERENCES

Farmer et al.: J. Chem. Soc. (London), 1946; pp. 10–13.

Ingold: Structure and Mechanism in Organic Chemistry (1953), Cornell Univ. Press, Ithaca, New York; pp. 586–601.

Simonsen: The Terpenes, vol. II, 2nd edition, 1949, pp. 214–216.

Weinhaus et al.: Chemical Abstracts, vol. 19, pp. 52 and 53 (1925).

Beilstein's Handbuch der Organischen Chemie, 1923 edition, Band 6, p. 101.